United States Patent [19]

Lemelson

[11] Patent Number: 4,655,146
[45] Date of Patent: Apr. 7, 1987

[54] REACTION APPARATUS AND METHOD

[76] Inventor: Jerome H. Lemelson, 48 Parkside Dr., Princeton, N.J. 08540

[21] Appl. No.: 636,680

[22] Filed: Aug. 1, 1984

[51] Int. Cl.$^4$ .............................................. F23G 5/26
[52] U.S. Cl. .............................. 110/346; 110/101 CF; 110/188; 110/230; 110/233; 110/246; 110/247; 110/347; 122/24; 431/1; 431/114
[58] Field of Search ................ 110/185, 210, 212–214, 110/230, 233, 246, 247, 345, 346, 186, 188, 101 CF; 431/1, 114; 122/24; 60/39.38, 39.76, 39.77

[56] References Cited

U.S. PATENT DOCUMENTS

| | | | |
|---|---|---|---|
| 3,404,643 | 10/1968 | Ankerson | 110/247 X |
| 3,436,061 | 4/1969 | Zinn | 110/247 X |
| 3,616,767 | 11/1971 | Southwick | 110/185 |
| 3,631,823 | 2/1970 | Scogin | 110/213 |
| 3,680,503 | 8/1972 | Danielsson et al. | 110/247 |
| 3,947,226 | 3/1976 | Neumann et al. | 431/114 |
| 4,041,906 | 8/1977 | Edwards | 122/24 X |
| 4,101,632 | 7/1978 | Lamberti et al. | 110/345 X |
| 4,334,485 | 6/1982 | Guida | 122/24 X |
| 4,417,868 | 11/1983 | Putnam | 431/114 X |
| 4,489,664 | 12/1984 | Williams | 110/186 |

FOREIGN PATENT DOCUMENTS 3025794 1/1982 Fed. Rep. of Germany ...... 110/185

Primary Examiner—Albert J. Makay
Assistant Examiner—Steven E. Warner

[57] ABSTRACT

An apparatus and method for continuously treating material for performing such functions as burning, roasting, smelting, coking, melting, high temperature chemical reactions and the like in a combustion chamber wherein the chamber or an extension thereof, is tuned to permit combustion gases therein to resonate and to thereby effect maximum combustion efficiency. In particular, the invention concerns controllably varying the geometry of the combustion chamber, such as the length of a pipe or tubed section thereof in accordance with the variables of combustion occuring therein, so as to optimize efficiency of combustion and the reaction which takes place between the burning material and the material being treated or reacted on. In addition to effecting such reactions, the apparatus is also operable to effect the transfer of the heat of combustion to a heat transfer medium, such as water for generating steam or other form of heat transfer medium to maximize the utilization of the energy generated.

18 Claims, 5 Drawing Figures

REACTION APPARATUS AND METHOD

SUMMARY OF THE INVENTION

This invention relates to a high temperature heating and reaction apparatus and in particular to an apparatus and method for effecting chemical and physical reactions at high temperature, such as melting, roasting, refining, heat treating, incinerating and the like wherein heat transfer during the reaction or burning process and burning efficiency is maximized as a result of acoustic wave movement of combustion gases within a properly tuned combustion chamber or an acoustic wave extension or extensions thereof.

It is known in the art to flow gaseous and liquid fuels to a combustion chamber which forms one end of a tuned tubular combustor and to ignite such fuel and sustain combustion in the chamber as a result of the gas column defined by the tubular extension of the combustor. Valveless pulse-jets have been designed and operated wherein the dynamics of flow of the hot combustion gases occur at a resonant frequency resulting from the acoustic design of the tubular extension of the combustion zone. If properly designed and tuned, such a combustion device will burn fuel at maximum combustion efficiency wherein the amount of unburned fuel or products of combustion will be minimized if not substantially eliminated.

The instant invention employs a reaction apparatus based on an acoustically tuned reactor and means for automatically controlling the flow of a fuel and reaction material into the combustion zone of the reactor in a manner to properly sustain combustion, attain desired reaction results with a minimum expenditure of fuel and substantially reduce or eliminate unburned fuel or burnable products of reaction, so as to reduce pollution of the surrounding atmosphere. In a preferred form of the invention, the apparatus is computer controlled to optimize its operational efficiency by automatically controlling the flow of fuel and reaction material to a combustion zone in accordance with signals derived from sensing combustion variables. One or more solid, liquid or gaseous fuels may be employed and are automatically fed and controlled as to rate of flow to the reaction apparatus. One or more reaction materials requiring the heat generated by combustion of the fuel are also controllably fed to the reaction zone while the product or products of reaction are controllably removed either from the reaction zone or a zone below the reaction zone to which they fall or are conveyed. As a result, such reactions as the melting of metal, glass or other material from mineral, scrap or other components; the roasting or otherwise burning of metal ores; the incineration of refuse and toxic chemicals; the heat treatment of articles and materials; the high temperature coating of articles and other processes requiring high temperatures are optimized and effected with a minimum expenditure of fuel and energy.

In one form of the invention, a reaction chamber is formed of an elongated tube or pipe which extends vertically upwardly wherein the lower portion of the pipe or tube contains a grating for receiving either solid fuel and solid reaction material or solid reaction material wherein the fuel utilized is in the form of a liquid or gas fed into or below the grating and burned above the grating. Burning is initiated by means of a spark or burner located on or below the grating and is sustained and amplified or improved by the acoustic gas dynamics effected when the burning gases flow into and are caused to resonate in the elongated column of gas formed in the tubular portion of the reactor above the reaction zone. Such burning and hot gas resonation is effective in drawing a proper amount of air to sustain and effect proper combustion in the combustion zone from one or more openings in the reactor below the grating and/or the open upper end of the tube or tubular chamber.

In a particular form of the invention, respective inlet conduits receive controlled amounts of either a solid fuel, such as coal, and a reaction material such as a solid chemical or mixture of reactants, refuse, articles to be heat treated, scrap or ore, etc. or a combination of solid materials such as a coating material and a second material or articles to be coated therewith, a flux or fluxes and an ore or chemical, one or more catalysts and one or more chemicals, etc. If gaseous or liquid fuel is employed and is continuously or intermittently injected into the reaction zone and burned, two or more conveyors, such as screw conveyors, may be respectively disposed within inlet chambers to the reaction chamber and may operate, either continuously or intermittently, to respectively feed respective quantities of one or more rection materials to the reaction zone or above such reaction zone to fall by gravity thereto. As heat is applied to the reaction material as a result of acoustically controlled combustion in the combustion chamber, the material either roasts or breaks down in composition, chemically reacts at temperature, melts or is diffusion coated or otherwise combined with articles of manufacture or other material simultaneously fed into the reaction chamber. Solid products of reaction either fall through the grating or are dumped by means of a rotating pivoting turntable into a reception chamber or conveyor disposed beneath the reaction zone. Such a conveyor may be operated continuously or intermittently remove solid products of reaction and convey same to either a receptacle or the next stage used in processing the products of reaction. A heat exchange means in the form of a tubular coil surrounding the tubular portion of the reaction chamber may be utilized to transfer heat from the burned and burning gases through the wall of the chamber to the heat transfer medium, which may comprise water or other liquid, which may be converted to vapor or steam and utilized to operate a turbine and generate electricity or may be otherwise utilized in a chemical or physical reaction. In a particular form of the invention, if a solid fuel such as coal is burned in the reaction chamber, water or other liquid may be introduced to the reaction chamber in a manner to form a gaseous fuel which may be tapped or continuously removed from the upper end of the chamber and stored for future use or fed back into the chamber for use in the combustion and reaction process.

In another form of the invention, the reaction chamber is a long pipe or tube which is rotated during combustion, preferably about a horizontal or slightly inclined axis while material to be burned, roasted or otherwise processed at high temperature, is fed into one end of the reaction chamber and removed from the other end thereof. Combustion is effected by controllably directing one or more streams of gas or liquid fuel into the center of the reaction chamber through a pipe extending therethrough and burning same within the reaction chamber in a reaction which is sustained and enhanced by the hot gases which acoustically resonate within the elongated rotating tube reactor.

In another form, fine particles of a fuel and/or reaction material are injected into the reaction chamber and form a fluidized bed at one end of the reactor wherein combustion of fuel is effected at maximum efficiency as a result of resonance of the burning gas column of columns disposed above the reaction zone of the reactor.

Accordingly it is primary object of this invention to provide a new and improved combustion and reaction apparatus and method for burning and reacting on matter at high temperature.

Another object is to provide an improved apparatus and method for incinerating matter such as refuse, garbage and toxic chemicals wherein a fuel is burned and combustion efficiency is high.

Another object is to provide a chemical reaction apparatus and method employing a reactor in which combustion and high temperature reactions occur in a reactor having a sonically tuned resonance effect with respect to high temperature gases which are generated.

Another object is to provide an apparatus and method for burning or incinerating matter on a continuous basis wherein combustion efficiency is high due to sonic resonance generated in combustion gases resulting from reaction chamber configuration.

Another object is to provide an inclined furnace or reactor for continuously burning or otherwise processing matter in which hot gases are generated and, as a result of fuel flow control and combustion chamber configuration are almost completely burned at high combustion efficiency.

Another object is to provide a furnace or reactor in which gases of combustion are caused to resonate and, as a result efficiently draw ambient air into the reactor and utilize same to effect a high reaction efficiency.

Another object is to provide a sonic reaction apparatus and method in which a computer is employed to optimize combustion and reaction efficiency.

With the above and such other object in view as may hereinafter more fully appear, the invention consists of the novel constructions, combinations and arrangements of parts and combustion methods which will be hereinafter more fully described and illustrated in the accompanying drawings wherein are shown embodiments of the invention, but it is to be understood that changes, variations and modifications may be resorted to which fall within the scope of the invention as claimed.

DESCRIPTION OF THE DRAWINGS

In FIG. 1 is shown a combustion apparatus 10 which is particularly useful in treating or burning matter or generating high temperature reactions with respect to one or more chemicals fed to a combustion zone 13 of an elongated combustion chamber 11 wherein the chamber is formed with an elongated extension or stack 11A which is configured to provide a gas-dynamic resonating effect therein when combustion takes place in the combustion zone 13. Hot combustion gas rising in the column 12 of the combustion chamber 11 from the combustion zone 13 may be made to resonate acoustically if the length and diameter of the chamber 11 are of an acoustically tuned configuration and the combustion is properly controlled. As a result, high combustion efficiency may be effected when air is drawn in through one or more openings in 11H in the lower end of the chamber 11 and is controlled in its flow by the variable gas-dynamic pressures generated in the combustion zone and the column 12 of hot gas above such zone. In a preferred form, the upper end of the chamber 11 is open to the atmosphere or is connected to a further processing chamber for processing the hot gas emissions flowing through the column 12 from the combustion zone 13.

Figures 1, 1A:
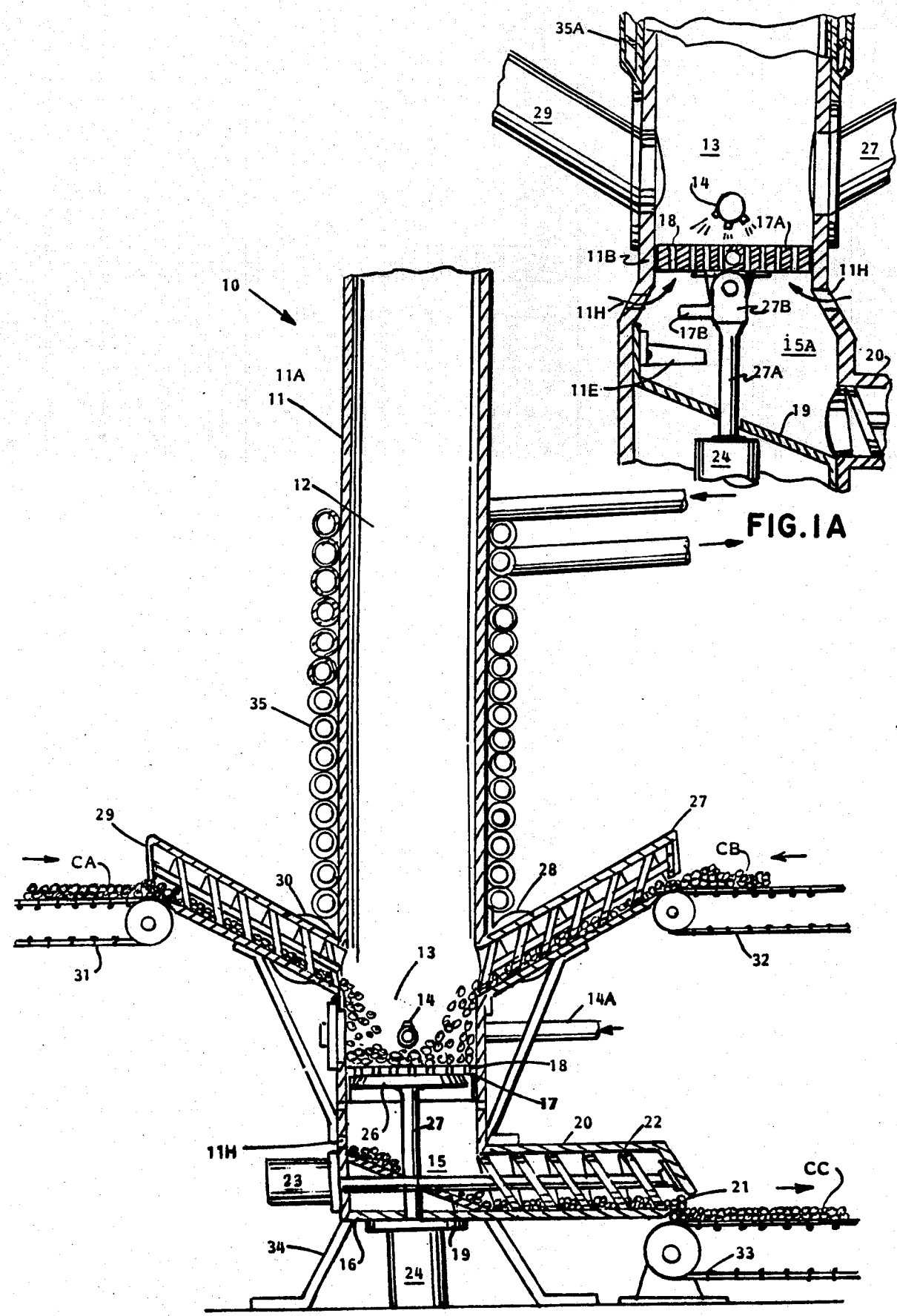
FIG. 1 is a side view with parts sectioned for clarity of a combustion-reaction apparatus for effecting reactions at high temperatures by burning a fuel or reaction material in the presence of another material to melt, incinerate, cause a chemical reaction to take place, reduce, heat treat or burn wherein hot combustion gases are generated and caused to resonate in a gas column extending from a reaction zone.
FIG. 1A is a partial side view with parts sectioned for clarity of a modified form of the reactor of FIG. 1

Located in the combustion zone 13 is a burner 14 for a fuel in gaseous or sprayable liquid state fed through an inlet 14A to one or more nozzles of such burner from a supply or reservoir of such fuel under pressure or via a fuel pump. Connected to openings in the sidewall of the chamber 11 are respective screw conveyors 27 and 29 for respectively feeding controlled quantities of two chemicals CA and CB fed thereto from respective flight conveyors 31 and 32. Gear motors 28 and 30 supported by the wall of the chamber 11 or a frame supporting the chamber, are connected to controllably rotate the feed screws of the conveyors 27 and 29.

Located at the bottom of the combustion zone 13 of the chamber 11 is a grating or grill 17 containing openings therein. Solid particulate or powdered chemical materials CA and CB fed by the screw conveyors 27 and 29 are fed to the combustion zone 13 where they flow to the upper surface of the grating 17 and either partake in the combustion process or are chemically and physically changed thereby. The results of the reaction or burning, a chemically changed or reduced material, may be caused to fall through the openings 18 in the grid against a tilted inner partition 19 located in the lower zone 15 of the chamber 11 below the burning or combustion zone 13. The partition or bottom wall 19 of the chamber feeds the resulting products of combustion CC to a third screw conveyor 20 which is driven by a gear motor 23, the screw 22 of which feeds such material through an opening 21 at the far end of the screw conveyor 20 to the upper flights of a third flight conveyor 33 for carrying such material away from the apparatus 10 to storage or a further processing stage.

In FIG. 1, a disc shaped plate 26 is supported at the end of a shaft 27 of a lineal motor or actuator 24 and may be employed to impact against the bottom surface of the screen or grating 17 to cause particulate material disposed on the upper surface thereof to fall through the openings 18 in such grating. The upper surface of the plate 26 may be formed with a plurality of pin-like protrusions which may comprise short sections of rod welded thereto to be pushed up through the interstices 18 in the grating or grid and to move the particulate material on the upper surface of the grating to cause such material to fall downwardly into the lower zone 15 against the inclined partition or end wall 19 to flow downwardly thereon to the entrance to the screw conveyor 20. In FIG. 1A is shown a modified form of the apparatus 10 wherein a perforated disc shaped cylindrical plate or grill 17A is pivotally supported at the end of a shaft 27A of a lineal actuator 24 and pivots when the shaft 27A is retracted downwardly into the enlarged lower volume 15A of the reactor wherein the pivotal action is such as to cause particulate reaction material disposed on the upper surface of 18 to slide therealong and fall downwardly against the upper surface of a slanted partition 19 which is operable to deliver such material to the entrance end of screw conveyor 20. A laterally extending arm portion 17C of a bracket 17B secured the underside of the perforated plate 17A engages the arm of a bracket 11E secured to the side wall of the lower portion 11B of the chamber when plate 17A is lowered pivoting the plate 17A in a clockwise direction causing material on its upper surface to slide thereoff and fall downwardly into volume 15A. The interstices or holes 18 extending through plate 17A permit air drawn in through a plurality of holes 11H extending through the outwardly tapered portion of the expanded lower side wall 11D to pass upwardly through the plate 17A as a result of combustion dynamics existing in the combustion zone 13 and the upper zone 12 in which acoustical wave effects are generated due to the acoustical geometry of the upper portion 11A of the tubular combustion chamber. Notation 27B refers to a U-shaped bracket welded to or formed at the end of shaft 27A for pivotally supporting plate 17A at the end of such shaft. Plate 17A is preferably spring loaded on its pivotal support to cause it to normally attain the horizontal position illustrated in FIG. 1A to permit it to be slidably inserted into the interior cylindrical volume 13 defining the lower end of the reaction chamber when motor or lineal actuator 24 operates to move the plate upwardly into the combustion zone 13 of the chamber.

Notation 35 in FIG. 1 refers to a helically wound heat transfer conduit, such as metal tubing drawn tightly against the outer surface of the cylindrical wall of the reactor 11 to permit heat generated within the volumes 12 and 13 to be transferred to a heat transfer liquid flowing through such tubing. In FIG. 1A, notation 35A refers to a tubed or ducted sheet heat transfer member which is tightly wrapped around the cylindrical outside surface of the wall of the elongated reaction chamber 11 to permit a fluid, such as water, passed through the helical passageway in the heat transfer panel 35A to be heated thereby and, in certain instances to be converted to steam. Such heated water may be used in a chemical process or, if steam is so generated, it may be used to operate a turbine for generating electricity.

Modifications in the operation of the apparatus illustrated in FIGS. 1 and 1A are noted as follows:

I. Combustion may be sustained in the reaction zone 13 of the vertical reactors 10 of FIGS. 1 and 1A by continuously or otherwise controllably feeding a solid fuel, such as coal or other material, through one of the screw conveyors 27 or 29 as described. Notation 14 may thus refer to a conduit for conducting a starting or sustaining fuel for combustion fed thereto through an inlet pipe or tube 14A extending from a pump and a reservoir of such fuel. If coal particles are so fed through one of the conveyors 27 or 29, the other conveyor may be employed to feed a second solid particulate material, as illustrated, to be heat treated, chemically changed as a result of the heat of combustion of the coal, incinerated or burned, or otherwise affected by the heat of combustion.

II. If a gaseous and/or liquid fuel is employed to sustain combustion in the combustion zone 13, it may be continuously or otherwise controllably fed through the inlet pipe 14A to one or more nozzles or burners defining the device 14 which may extend completely across the combustion zone and serve as a fmale holder or may be secured to and extending through or on top of the grating or grid 17 of FIG. 1, the disc shaped plate 26 of FIG. 1 or the piston shaped grid 17A of FIG. 1A.

III. Either or both of the reaction materials CA and CB may be such as to sustain or effect combustion in reaction zone 13 and to partake in a particular reaction therein involving such two materials to form a third material thereof or to effect the incineration of either or both of such materials to convert either or both to an acceptable chemical form.

IV. One of the materials CA, CB may comprise a basic chemical or material which is adapted to be reduced or catalyzed by the other at temperature effected, as described in the reaction zone 13 and while disposed on the upper surface of the grating or grid 17 or the piston shaped grid 17A.

Figure 5:
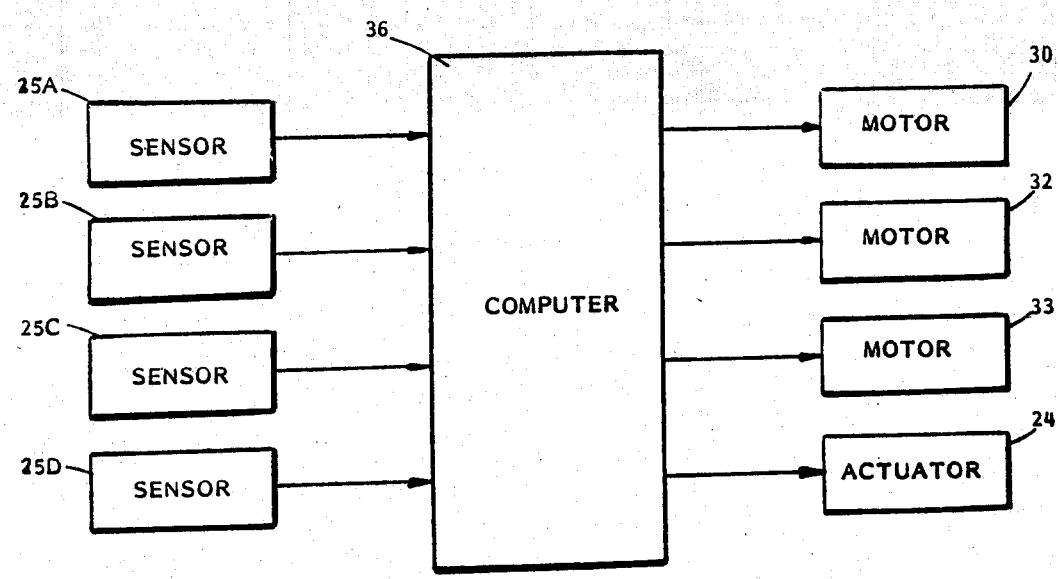
FIG. 5 is a schematic diagram showing a control system including a plurality of sensors for sensing incineration process variables and a master controller or computer for receiving and processing the signals output by such sensors and generating control signals for controlling the operation of motors and conveyors employed in operating the reaction apparatus of FIG. 1.

V. As shown in FIG. 5, any number or all of the motors employed to drive the flight belts of the conveyors 31, 32 and 33 as well as the lineal actuator 24 and the motors 23, 28 and 30 employed to operate the screw conveyors 20, 27 and 29 may be controlled by a single master controller or computer 36 to optimize the desired reaction, melting, treating or incineration of the material or materials fed into the reaction zone 13 as described. Such control may be effected in accordance with a program and/or in response to signals generated by one or more sensors disposed in reaction zone 13 and/or at other locations in the reaction chamber 11 for sensing such variables as temperature, transient pressure, reaction material and combustion gas composition.

VI. If fine enough particles from either or both the feed materials CA and CB are fed to the reaction zone, and suitable control is effected of gas flow into and out of the reaction zone, a fluidized effect of such particles may be attained in either of the volumes 12 or 13. Four of such sensors, denoted 25A,25B,25C and 25D are shown in FIG. 5 connected to the computer 36 which operates in accordance with the signals it receives from the sensors to control the operations of the lineal actuator 24 and the motors 23,28 and 30 as described.

VII. The grill or gratings 17 and 17A of FIGS. 1 and 1A may contain one or more burners, burning nozzles or flame holders for burning a liquid or gaseous fuel immediately above and/or within the grill or for initiating the combustion of coal or other combustable material disposed on the grill as described. Also, one or more auxilliary burners may be provided at one or more locations along the column 12 supported by the wall of the tube or chamber 11 or a tube extending axially through the chamber and supported in or immediately above region 13., for effecting more complete combustion.

VIII. A single combustion chamber or furnace having an elongated shape, such as an elongated cylinder, may have a plurality of resonant tubes such as elongated chamber 11 extending therefrom, such as upwardly and parallel to each other or otherwise, each operable to receive a different portion of the combustion gases from the common chamber and to provide heat transfer steam generating or direct heat-to-electrical energy conversion means. Said chambers may also contain catalyst or other means for converting products of combustion such as the hot burning gases to harmless or useful constituents or for passing same to further processing means.

IX. Conveying means other than shown in FIG. 1, such as a flow of a liquid or electromechanical conveyor may be employed to remove products of reaction or combustion from the lower chamber 15.

Figure 2:
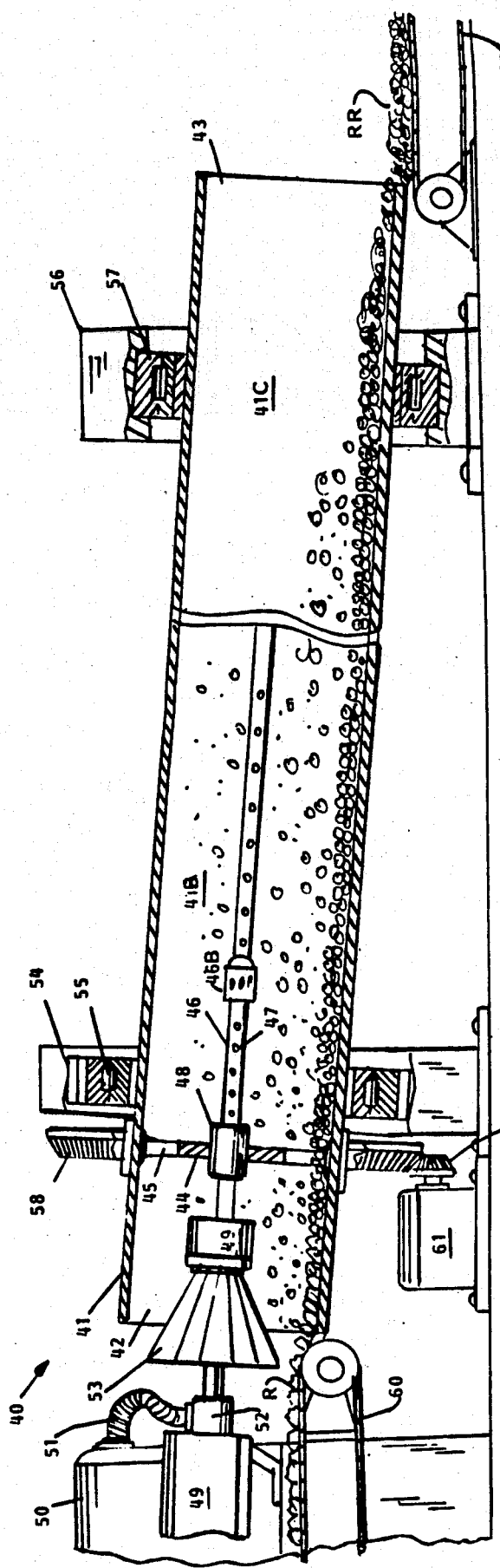
FIG. 2 is a side view with parts sectioned and broken away for clarity or a rotary reaction apparatus, a modified form of that shown in FIG. 1.

In FIG. 2 is shown a modified form of burning and reaction apparatus 40 employing an elongated cylindrical reaction chamber 41 having an open front end 42 and an open rear end 43 and adapted to be power rotated about its longitudinal axis as it operates to incinerate or effect high temperature reaction within the interior volume 41B thereof. Extending centrally through the cylindrical chamber 41 is an elongated tube or pipe 46 through which liquid or gaseous fuel is fed from a reservoir 50. The tube 46 supports and supplys such fuel to one or more burners 46B and/or nozzles 47 which direct such fuel into volume 41B where it is burned to generate high temperatures for incinerating or causing chemical reactions with respect to material R continuously fed to the open end 42 on a belt or flight conveyor 60. The chamber 41 is shown rotationally supported by two large roller bearings 55 and 57 surrounding the chamber near the ends thereof and supported by respective uprights 54 and 56 in a manner such that the chamber is inclined to the horizontal a degree to cause reaction material or refuge R to travel at a predetermined rate by gravity toward the exit end 43 as the chamber rotates. Controlled rotation of the chamber 41 is effected by a gearmotor 61 having a tapered spur gear 62 secured to its output shaft and engaging the teeth of a larger spur gear 58 surrounding and secured to the wall of chamber 41. A flight or metal wire belt conveyor 63 continuously conveys burned or incinerated refuse or the product of reaction from the exit end 43 to storage or further processing means.

Tube 46 is supported at the center of one or more spider like supports 44 having openings 45 therein through which material R may pass and flow down the reaction chamber 41 as the latter is power rotated. Such supports 44 are welded or otherwise fastened to the inside surface of the wall of 41. The tube 46 may rotate with or remain stationary within the chamber and is supported within one or more bushings 48 secured to the centers of the hubs of the supports 44. Notation 52 refers to a coupling, such as a rotary coupling, secured to the output shaft of a gear motor supported at the front end of the chamber 41. A flexible metal hose 51 connects the output of reservoir 50 or a fuel pump forming part of 50 to the coupling 52 permitting fuel to be continuously fed to the interior of tube 46. Liquid and/or gaseous fuel may be continuously or intermittently burned by one or more of the burners 46B and/or each the the nozzles 47 with burning occurring radially of the tube 46 and, in one or manners as previously described to effect sonic respnance and/or spiral or helical movement of the hot gases generated by burning, incineration and/or chemical reaction.

Although not illustrated, the interior surface of the wall of the cylindrical chamber 41 may be formed with or have attached thereto a plurality of cleat-like protrusions operable to carry material R opwardly as the chamber rotates and to cause such material to fall freely through the reaction zone and/or tumble downwardly to explose all surfaces of such material to the flame and hot gases of combustion to incinerate or otherwise treat same or effect a chemical reaction therewith or between components or elements thereof.

Figure 3:
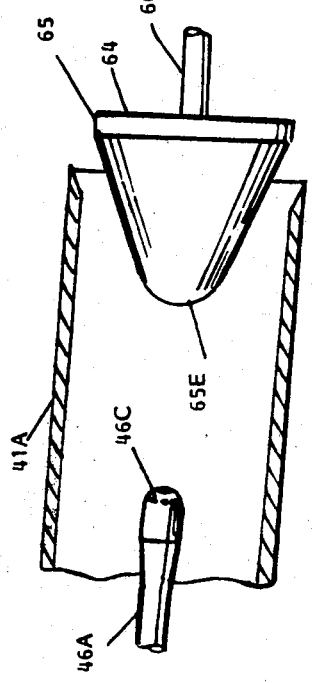
FIG. 3 is a partial side view with parts sectioned for clarity of part of the reaction apparatus of FIG. 2 modified at its exhaust end with a flow control means.

Notation 49 refers to an annular housing containing one or more motors, servos or drive means for a plurality of blades 53 which form a conically shaped closure means adapted to partially or completely close the open end 42 in accordance with combustion or reaction requirements. In FIG. 3 a conically shaped closure 64 for the end opening of the chambers 41 or 11 comprises a metal or ceramic coated sheet metal cone 65 with a rounded end 64E which is welded to a disc 64D supported at its center by a shaft 66 which extends from a lineal actuator (not shown) supported downstream of the end 41A of the chamber. The actuator is controllable in its operation to vary the position of its output shaft or drive mechanism to selectively locate the device 65 so as to selectively vary the annular space between the wall of the cone 65 and the cylindrical wall of the chamber 41 at its end. When fully projected into the chamber, the device 64 may serve to completely close off the end of the chamber for a period of time necessary to effect a particular type of burning or incineration operation within the interior volume 41C. During other periods of time, the longitudinal locations of the device 64 may be such as to result in maximizing burning or reaction efficiency in the chamber or effect a predetermined change in the material(s) disposed therein. The motor driving shaft 66 axially with respect to the longitudinal axis of the chamber 41 (or 11) may be controlled in its operation by a computer which is either programmed in its operation to effect control of fuel burning and the flow of reaction or incineration material(s) to the chamber or provides command control signals for controlling burning, the flow of reaction material and the operation of either or both inlet and exhaust closure or limiting devices 53 and 64 by controlling the motors driving same in accordance with signals generated by one or more sensors sensing process variables such as temperature(s), pressure(s), composition(s) of reaction gases and reaction materials, etc which signals are processed and analyzed by such computer for generating such control signals operable to control fuel flow, burning and air flow as well as feed rate of the one or more reaction materials fed to the head end 42 of the chamber 41.

Figure 4:
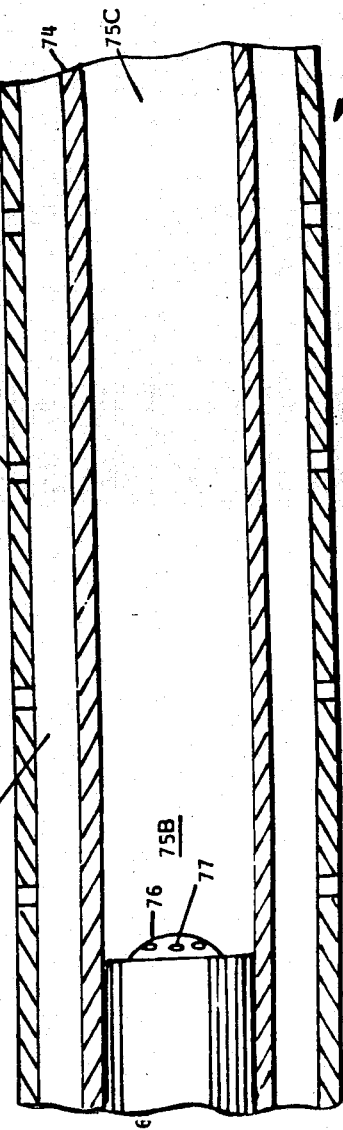
FIG. 4 is a partial side view in crossection of a concentric reaction chaber or burner and steam generator applicable to mining oil from oil burning sands.

In FIG. 4 is shown an assembly 70 of two cylindrical metal tubes or pipes 71 and 74 providing an annular volume 73 exterior of and separated from the volume 75C of the inner pipe 74. Located within the inner pipe 74 are one or more burners 76, spaced apart from each other a distance of at least 20 times the diameter of pipe 74 to permit a resonating gas dynamic effect to be derived during burning to optimize such burning and the transfer of heat to the wall of pipe 74 and a fluid in the annular volume 73 between the pipes. Such a fluid flowed through volume 73 may comprise water which is converted to steam. A plurality of holes 72 in the wall of pipe 71 may be provided to permit steam or hot water to escape from volume 73 and/or fluid such as oil to be drawn into volume 73 such as in oil recovery from sandy soil. Both fuel, such as oil, and air and fed from the jets or orifices 77 of the nozzle into the burning region 75B of the burning chamber 75C. A valve or openings may be provided in the wall of pipe 74 downstream of the section shown for admitting air or other fluid into volume 75C.

Modifications to the apparatus disclosed in FIGS. 1 to 4 and modifications thereof are noted as follows:

1. A helical type of motion may be imparted to the burning gases in the reaction and burner devices of FIGS. 1 and 4 to further improve combustion and enhance combustion efficiency. Such motion may be effected by either or both of two techniques, one in which gaseous or liquid fuel is burned in the combustion zone of the apparatus while such fuel is forced to flow either in a circular path and/or in a spiral path from one or a plurality of burners or nozzles by axially directing the flow axis of the nozzle(s) or burner(s) either tangential to the longitudinal axis of the furnace or combustion device or in a path or paths to inmpose a spiral movement to the fuel and burning gases generated when such fuel burns. Such spiral movement not only serves to increase turbulance in the burning zone but also to delay the exhausting of burning gas and the hot gases of combustion to permit the gases to burn more completely and the material being incinerated or reacted on to be subjected to combustion heat of such reaction or fuel gases for a longer time interval. For example, in the embodiments of FIGS. 1 and 1A, a spiral motion may be imparted to the burning gases by properly directing one or more jets of the burner tangentially to the longitudinal axis of the chamber. In the embodiment of FIG. 4 each of the burners or burner nozzles attached to the elongated central tube may be mounted so as to direct the burning fuel eminating therefrom tangentially or in a tangential-longitudinal direction to effect such a spiral fuel and burning gas—hot gas movement along the tube.

2. Helical movement of the burning or hot gaseous fuel may be imparted thereto by means of suitable vanes or deflectors elded to the wall of the reaction chamber and the elongated tubular section extending therefrom which movement may have the described resonant gas movement superimposed or imparted thereto for further enhancing combustion efficiency.

3. A power rotated vane or vanes defining one or more impellers supported on a common shaft or shafts may be driven by one or more motors located within or externally of the combustion chamber with the impeller blades located within the chamber, may be employed to impart suitable spiral or helical motion to the combustion and/or hot burned gases in the combustion zone and downstream thereof. In the embodiment of FIGS. 1 and 1A such as impeller or impellers may be mounted on or adjacen the burner or burners. In FIG. 4 such blade arrangement may be supported on the central tube for rotation therewith or thereon as fuel is injected into the combustion zone or zones. Such impeller or blade arrangement may also be employed to impart spiral movement to the fuel and/or air flowed or injected into the combustion chamber.

In FIG. 2 the swirling spiral or circular movement(s) of burning and hot burned gases in the elongated chamber 41 together with the tumbling and rotary movement of the refuse or reaction material resulting from rotation of the chamber and the lifting or moving action of the described blades or vanes attached to the inside wall of the chamber, may be employed to enhance burning and incineration or reactive action.

The geometry of the combustion or reaction and sonic resonating zone of the burning chambers described will be determined in accordance with the diameters and lengths of such zones which will yield or provide the described acoustical resonance of the burning and non-burning gases of combustion. For configurations where the diameters of the combustion zones of such reactors are substantially the same as the diameters of the resonating gas columns connected to such zones, a ratio of about twenty to one of length to diameter will suffice to yield high combustion efficiencies. In other words, a combustion chamber which is four feet in diameter would be about seventy eight to eighty feet long.

I claim:

1. A method of burning matter in a reactor comprising:
   (a) controllably admitting select amounts of a reaction material to be burned and a fuel for burning said reaction material to a combustion zone of an elongated combustion reactor having at least one walled gas column defining an exhaust region operatively coupled to said combustion zone for receiving and conducting hot gases of combustion from said reaction zone, wherein said gas column is operatively dimensioned so as to cause hot combustion gases flowed thereto from said combustion zone during the combustion of said fuel to resonate at the natural sonic frequency of said gas column,
   (b) continuously burning said fuel and said reaction material in said combustion zone and generating and maintaining a gas-dynamic resonating movement of hot gas in said gas column and causing, by means of the resonating movement of said hot gas in said gas column, the inducement of flow of ambient air into said combustion zone so as to sustain said combustion at a high combustion efficiency,
   (c) causing reaction material burned in said reaction zone to flow through said reactor downstream of said reaction zone and to be subjected to the hot gases of said resonating gas column in travel beyond said reaction zone, and
   (d) continuously removing the products of reaction from said reactor beyond said reaction zone.

2. A method in accordance with claim 1 which includes inclining said elongated reactor to the horizontal and rotating same as said reaction material is fed to said combustion zone so as to cause said reaction material to be longitudinally conveyed along said reactor as it is burned.

3. A method in accordance with claim 2 which includes causing said reaction material to be completely incinerated downstream of said reaction zone by the hot combustion gases in said resonating gas column.

4. A method in accordance with claim 3 which includes intermittently burning said material downstream of said reaction zone.

5. A method in accordance with claim 1 which includes detecting at least one combustion variable in said reactor and generating electrical signals indicative of said variable, computer processing and analyzing said electrical signals and generating a control signal and applying said control signal to control one or more combustion variables.

6. A method in accordance with claim 5 wherein said control signal is applied to control the rate of flow of a combustible material to said combustion zone.

7. A method in accordance with claim 5 wherein said control signal is applied to control the rate of flow of said material to be incinerated to said reaction zone.

8. A method in accordance with claim 5 wherein said control signal is applied to control the flow of ambient air to said reactor.

9. A method in accordance with claim 1 which includes continuously and controllably moving said reaction material through said reactor so as to present different portions of said reaction material to the heat of combustion of said fuel.

10. A method in accordance with claim 9 wherein the continuous movement of said reaction material within said reactor is effected by rotating at least a portion of the wall of said reactor and disposing said reaction material against said rotating wall portion to permit the rotating wall portion to carry said reaction material in a path so as to subject the different portions of said reaction material to the frame and direct heat of said combustion.

11. A method in accordance with claim 9 wherein the continuous movement of said reaction material is effected by depositing said reaction material on a moving member, and, after the predetermined incineration thereof, removing said reaction material from said moving member.

12. A method in accordance with claim 1 which includes imparting a spiral movement to the molecules of the hot combustion gases as they travel through said gas column to improve combustion efficiency.

13. A method in accordance with claim 12 which includes transferring a substantial portion of the heat of combustion from said gas column to a liquid, such as water, and applying same to perform work.

14. A method in accordance with claim 12 which includes transferring a substantial portion of the heat of combustion existing in said gas column to a liquid, such as water, and generating steam therefrom and utilizing said steam to operate an electrical energy generator.

15. A method of burning matter in a reactor comprising:

controllably admitting select amounts of a reaction material and a fuel for burning said reaction material to a combustion zone of a combustion reactor having at least one walled gas column coupled to said combustion zone for receiving and conducting hot gases of combustion from said reaction zone, wherein said gas column is operatively dimensioned so as to cause hot combustion gases, flowed thereto from said combustion zone during the combustion of said fuel, to resonate at the natural sonic frequency of said gas column, continuously burning said fuel and said reaction material in said combustion zone and generating and maintaining a gas-dynamic resonating movement of hot gas in said gas column and causing, by means of said resonating movement of said hot gas in said gas column, the inducement of flow of ambient air into said combustion zone so as to sustain combustion in said reactor at a high combustion efficiency, transferring a portion of the heat generated during the reaction from the gas in said hot gas column to a heat transfer medium disposed adjacent said hot gas column, and continuously removing the products of reaction from said reactor as they are formed.

16. A method in accordance with claim 15 wherein the step of continuously removing the products of reaction from said reactor is effected by controllably operating a conveyor for receiving and removing products of reaction from said reactor.

17. A method in accordance with claim 15 wherein said select amount of said reaction material is admitted to said combustion zone of said combustion reactor by controllably operating a conveying means for receiving and conveying said reaction material directly into said reaction zone in a controlled manner such that the resonating movement of hot gas in said gas column continues during the combustion of said fuel in said reaction zone.

18. A method in accordance with claim 17 which includes controllably operating a plurality of conveyors to cause each to convey a respective controlled amount of reaction material to said reaction zone.

* * * * *